US006300935B1

(12) United States Patent
Sobel et al.

(10) Patent No.: US 6,300,935 B1
(45) Date of Patent: Oct. 9, 2001

(54) IMAGE INTERPOLATION CIRCUIT ARCHITECTURE AND METHOD FOR FAST BI-CUBIC INTERPOLATION OF IMAGE INFORMATION

(75) Inventors: Arthur Sobel, Los Altos Hills; Todd S. Sachs, Menlo Park, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/295,727

(22) Filed: Apr. 20, 1999

(51) Int. Cl.$^7$ ........ G09G 5/02

(52) U.S. Cl. ........ 345/150; 345/153; 345/154; 345/155

(58) Field of Search ........ 345/149, 147, 345/150, 152, 153, 154, 155, 72, 76, 77, 132, 505, 519

(56) References Cited

U.S. PATENT DOCUMENTS 5,060,055 * 10/1991 Kim ........ 348/793
5,075,767 * 12/1991 Takaragi ........ 358/515
5,669,013 * 9/1997 Watanabe et al. ........ 710/5
5,920,305 * 7/1999 Yoon ........ 345/153
6,133,953 * 10/2000 Okada ........ 348/272
6,181,330 * 1/2001 Yui et al. ........ 345/204

OTHER PUBLICATIONS

Parker, J. Anthony, et al., "Comparison of interpolating Methods for Image Resampling", IEEE Transactions in Medical Imaging, vol. MI–2, No. 1, Mar. 1983.

* cited by examiner

*Primary Examiner*—Jeffery Brier
*Assistant Examiner*—Thu-Thao Havan

(57) ABSTRACT

A circuit architecture and method are provided for interpolating a first color value associated with a first color and a second color value associated with a second color for use in generating a pixel that represents a portion of a digital image, based on a third color value that is associated with a third color. Pixel data generated by a digital image sensor is serially received at a register array organized in rows and columns that correspond to pixels of interest that are used in a bicubic interpolation process. Values stored in registers of the register array are coupled to and continuously available to four (4) dot product modules and an interpolator. As the serial data arrives, it is clocked stepwise through the registers, and concurrently used by the dot product modules and interpolator to compute the first color value and the second color value. Data that reaches the end of a line of registers is moved into a corresponding shift register for temporary storage until it is needed again. Advantageously, the method may be implemented in integrated circuit hardware and using fast combinational logic with no CPU multiply operations and no floating-point operations. A particular application is in interpolating complementary colors for pixel information received from a color area sensor, such as a CCD image sensor, in a digital camera.

25 Claims, 12 Drawing Sheets

IMAGE INTERPOLATION CIRCUIT ARCHITECTURE AND METHOD FOR FAST BI-CUBIC INTERPOLATION OF IMAGE INFORMATION

FIELD OF THE INVENTION

The present invention generally relates to computer graphics. The invention relates more specifically to electronic circuits useful in interpolating color information in a computer-generated graphical image.

BACKGROUND OF THE INVENTION

Color display devices that are used by computers and by computer-related devices such as digital cameras, generally comprise a two-dimensional matrix of display elements or pixels. Each pixel comprises a Red ("R"), Green ("G"), and Blue ("B") cell. Each display device cell is represented by a corresponding memory cell that may store a numeric value. The memory cell values usually are 8, 10, or 12 bits in size, and may be stored in any other convenient size. A computer program may cause a particular pixel to glow in any visible color, or to appear black or white, by setting the numeric values of its red, green, and blue cells to an appropriate value.

In many products and applications, some of the pixel information is generated or "interpolated" by a computer processor or CPU based on other information. Within the general field of computer graphics displays, there is an acute need to improve the way that displays generate or interpolate missing color information. In products that use display devices that are driven by a sensor, there is a particular need to improve the methods and mechanisms that are used to generate interpolated color information.

The following description will focus on particular problems encountered with digital cameras that use CCD sensors to receive light and form a digital picture for display by a color LCD display of the camera. However, the problems described herein occur in many other contexts, and the solutions described herein are applicable to such contexts. For example, the problems and solutions described herein are applicable to all color area sensors that use a two-dimensional array of sensing elements.

Generally, when a digital camera CPU receives image information from the camera sensor, each pixel provided by the sensor represents only one optical color, usually Red, Blue, or Green. The pixels are arranged in and arrive in a pattern, which corresponds to the physical placement of sensing elements in the sensor. In one pattern, a first line of the sensor has alternating Red and Green pixels, and the next line has alternating Green and Blue pixels. The pattern continues for the entire CCD sensor, which has a checkerboard or mosaic pattern.

FIG. 5 is a block diagram of a 7-by-7 portion 500 of sensor elements 502, 504, 506 that illustrates one pattern that is used by some CCD sensors. A first line 510 of portion 500 comprises a first Red pixel 502*a,* a first Green pixel 504*a,* a second Red pixel 502*b,* a second Green pixel 504*b,* and so on in an alternating pattern. Second line 512 of portion 500 has a first Green pixel 504*c,* a first Blue pixel 506*a,* a second Green pixel 504*d,* a second Blue pixel 506*b,* and so forth. This two-line pattern is repeated across the entire surface of the sensor. When the sensor delivers pixel information to a CPU or other element, the information arrives in the same pattern.

Each pixel value may be an 8-bit quantity, 10-bit quantity, 12-bit quantity, or a numeric quantity of some other size. For convenience, in FIG. 5 each pixel is labeled with a numeral from 11 to 77 that identifies its relative position in the 7-by-7 portion 500.

In the foregoing pattern, there are twice as many Green pixels as there are Blue pixels or Red pixels. This is done because the human eye has been found to perceive Green as the most important color in an image, and also because the semiconductor materials that are used to form the sensors are less sensitive to light of Green wavelengths.

The pixel information receive using this checkerboard pattern, however, cannot be directly displayed on a graphic display device. An image may be produced only by adding further pixel information to the pattern of pixel information. Each element of the display comprises the combination of a Red, Green, and Blue pixel and corresponding pixel value, however, each element of the sensor represents only one of the three colors. Thus, two additional complementary color values must be generated and stored in association with the single color value received from the sensor.

For example, in the first line of the portion 500 of FIG. 5, for the first Red pixel 502*a,* Green and Blue color values must be created and stored. For the next pixel, which is Green pixel 504*a,* a Red value and a Blue value must be created and stored. This process is called "color interpolation" and must be rapidly carried out for every pixel value that is received from the sensor. An image may be displayed only after the interpolation step is complete.

Several past approaches are known for carrying out color interpolation. For example, bilinear interpolation involves an averaging approach. At each Blue pixel, to interpolate the Green value, the surrounding four (4) Green values actually received from the sensor are obtained, and their arithmetic mean is computed. The mean value becomes the interpolated Green value. This approach is simple, but relatively inaccurate in terms of color fidelity and image appearance.

A more accurate prior approach is bicubic color interpolation. Bicubic interpolation is similar to bilinear interpolation, but involves using more neighboring pixels and applying a computation that is more complex than averaging.

In one approach, the computation considers a 7-by-7 matrix of pixels, in which the pixel for which interpolation is carried out lies at the center of the matrix, and the computation considers three (3) neighbor pixels in each linear direction. For example, the matrix of FIG. 5 may be used. In this example, Blue pixel 41 is the center pixel for which interpolation is carried out and all other pixels illustrated in FIG. 5 are neighbors. In this approach, a corresponding matrix of coefficient values is defined and stored. Each coefficient has a floating-point value between "0" and "1". Each coefficient value is defined by a non-linear curve that reflects the relative contribution of each neighbor pixel to the complementary color values of the center pixel. Each coefficient value of all neighbor pixels of a particular color is multiplied by the value of the center pixel, then all the products are summed, and then the arithmetic mean of the products is taken. The result is the pixel value for that particular color.

FIG. 6 is a graph of one possible curve 600 of one line of the coefficient values. Vertical axis 602 represents the relative contribution of a particular pixel and therefore the magnitude of the coefficient. Horizontal axis 604 represents distance from the center pixel 41. Thus, generally, coefficient values decrease in a non-linear manner with increasing distance from the center pixel. In an embodiment, curve 600 is applied to a finite number of discrete coefficient values, such as seven, so that not all possible values of curve 600 are represented in the stored coefficients.

This approach has a significant disadvantage, namely that it is very computationally intensive. Referring to FIG. 5, assume that a bicubic interpolation process is executing, and that Blue pixel 41 is the pixel for which interpolation is currently being performed. Blue pixel 41 has twenty-four (24) non-zero Green neighbor pixels. Each Green neighbor pixel is associated with a co-efficient value having a value between "0" and "1". Thus, the approach would require considering 24 non-zero Green neighbor values and 24 associated coefficients.

Accordingly, this would require a CPU to perform 24 floating-point multiply operations to compute the contribution of each coefficient, and 23 add operations to yield a value for the Green color. The CPU would then have to compute the Red value. For Red and Green, a total of 40 floating-point multiplies and 30 adds are required. If the entire CCD sensor has 6 million pixels, this approach may take 10–12 seconds to carry out, which is unacceptably long. Thus, this approach is computationally too intensive for current microprocessors, especially when executed by the processors of the type now used in digital cameras and similar devices.

Other past approaches are described in J. A. Parker et al., "Comparison of Interpolating Methods for Image Resampling," MI-2 IEEE Transactions on Medical Imaging 31 (March 1983).

A related problem involves processing image data that is delivered serially from the sensor to a processor, for example the CPU of a digital camera.

A typical CCD camera sensor comprises an array of CCD sensors arranged in rows and columns. Between each column of CCDs there is a vertical shift register. At the bottom of all the columns is a horizontal shift register. When an image is formed by opening the shutter of the camera, each sensor in the array, which represents a pixel, is exposed for a length of time that is determined by a sensor controller. Then, information produced by all the sensors is transferred to the vertical shift registers. The information is then transferred, one pixel value at a time, to the horizontal shift register. The first pixel that is transferred corresponds to the upper left part of picture.

Thus, serial data is delivered from the sensor to a CPU, or to another hardware device such as photo processor 208 shown in FIG. 2. The CPU or other hardware device "sees" a line of pixel data comprising a Red value, Green value, Red value, Green value, and so forth. The next line of pixel data comprises alternating Green and Blue values. Generally, the lines are 1024 to 3000 pixels long, and the pixel data is delivered by the sensor at about 20 MHz.

Before the CPU or other device may carry out interpolation on the pixel data, the CPU must correct for any errors in each pixel value. For example, the CPU may carry out photo-response non-uniformity (PRNU) correction. PRNT correction generally involves multiplying pixel data that corresponds to a particular color by a correction factor or coefficient that corrects for non-uniformity of the color filters of the CCD for that particular color. For example, it is known that certain semiconductor materials, from which the sensors are made, are more sensitive to red light than to blue light. PRNU correction adjusts for this variance in sensitivity.

After PRNU correction, a stream of corrected pixel data arrives at the CPU or other hardware device. The CPU may transfer the values to a memory, such as a high-performance SDRAM. The CPU may then begin carrying out interpolation of the missing color information. For example, the CPU may apply bicubic color interpolation using 7-by-7 blocks of memory. To obtain all the values needed to carry out interpolation for a particular pixel, however, the CPU must access 49 addresses in memory. Each access may involve computing an address and an offset value. If the data arrives at 20 MHz, just to keep up with the data stream, the CPU must operate with a memory clock cycle of at least 49×20 MHz, or 980 MHz. This is impractical for currently available SRAMs.

Thus, there is a need for an improved color interpolation approach that has a reduced computational burden.

In the field of digital cameras, there is a particular need for a color interpolation approach that can efficiently carry out color interpolation computations for digital images within the computation horsepower available in the digital camera.

There is also a need for a image processing circuit architecture that can process interpolation data at no more than the serial data output frequency of a typical sensor.

There is a particular need for an image processing circuit architecture that is adaptable to an interpolation approach that uses combinational logic.

SUMMARY OF THE INVENTION

The foregoing needs and objects, and other needs and objects that will become apparent from the following description, are achieved by the present invention, which comprises, in one aspect, an image processing circuit that generates a plurality of color values each representing color components of a pixel of a digital image. In one embodiment, the circuit comprises a register array organized in a plurality of lines of registers, a plurality of shift registers, in which each of the shift registers is coupled to receive an input from one of the lines of registers and to shift said input to another one of the lines of registers, a plurality of dot product modules, each coupled to the register array, each of which generates an interpolated color value based on the register array, and an interpolator module configured to receive image data values stored in the register array into the dot product modules, select at least one of the dot product modules for use in generating one of the color values, and generate the color values based on at least a result of the selected dot product module.

According to one feature, the interpolator module is configured to generate one of the color values based on a center register value that is stored in a center register of the register array. In another feature, the interpolator module receives one or more sensor size signals that identify one or more attributes of a sensor that is used to form the digital image, and wherein the interpolator module selects one of the dot product modules for use in generating one of the color values based on a current relationship of information that is stored in the register array to the attributes. In a related feature, the interpolator module receives a height signal and a width signal that respectively identify dimensions of a sensor that is used to form the digital image, and wherein the interpolator module selects one of the dot product modules for use in generating one of the color values based on a current relationship of information that is stored in the register array to the dimensions.

In one embodiment, the register array comprises forty-nine (49) registers organized in seven (7) lines of seven (7) registers each. In another embodiment, there are four (4) dot product modules, in which each of the dot product modules generates an interpolated color value of a first predetermined color based on a center value of the register array that represents a second color.

According to another feature, each of the dot product modules generates an interpolated color value of a first pre-determined color based on a center value of the register array that represents a second color. The dot product modules may comprise a first dot product module that generates a Green color value when the center value represents a Blue value or a Red value; a second dot product module that generates a Red color value when the center value represents a Blue value and generates a Blue value when the center value represents a Red value; a third dot product module that generates a Red color value when the center value represents a Green value among a plurality of alternating Green, Blue values and generates a Blue value when the center value represents a Green value among a plurality of alternating Blue, Green values; and a fourth dot product module that generates a Red color value when the center value represents a Green value among a plurality of alternating Green, Blue values and generates a Blue value when the center value represents a Green value among a plurality of alternating Blue, Green values.

Other aspects and features will become apparent from other portions of this document.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for interpolating image information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Digital Camera Architecture

Figure 1:
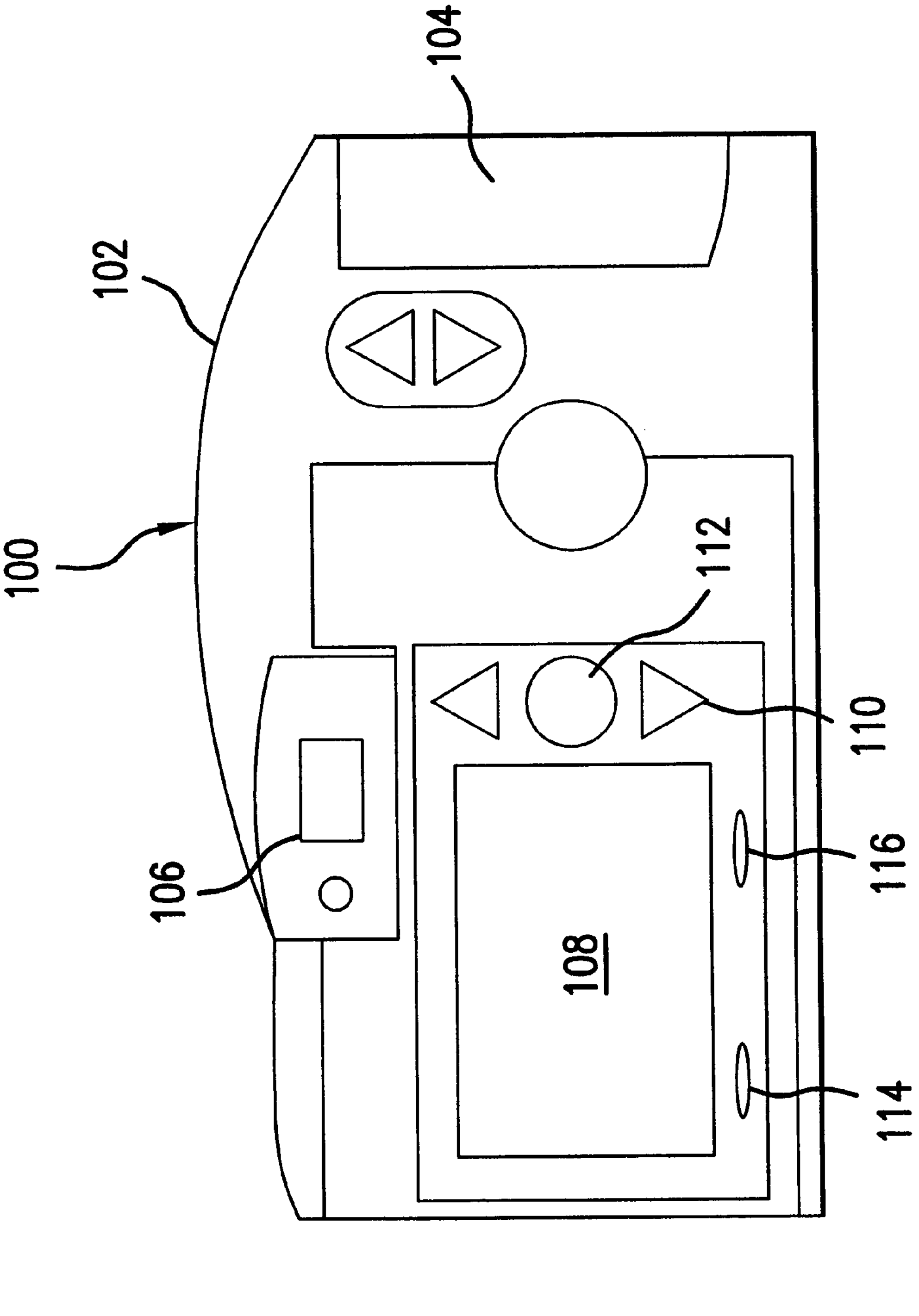
FIG. 1 is a rear elevation view of a personal handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens, so that a user of the camera who wishes to take a picture can look through the viewfinder 106 to line up the shot.

A display device 108 is mounted in the body 102. Stored images and camera settings may be viewed on the display device 108. In one embodiment, the display device 108 is a liquid crystal display (LCD) having a visible area that is approximately 2" (5 cm) in the diagonal dimension. Selection buttons 110, 112, 114, 116 are mounted in the body 102 adjacent to the display 108. The selection buttons 110–116 are used to signal various logical selections of options, commands, etc. based on the contents of the display 108. Use of the buttons 110–116 in the context of transporting digital images is described further below.

Figure 2:
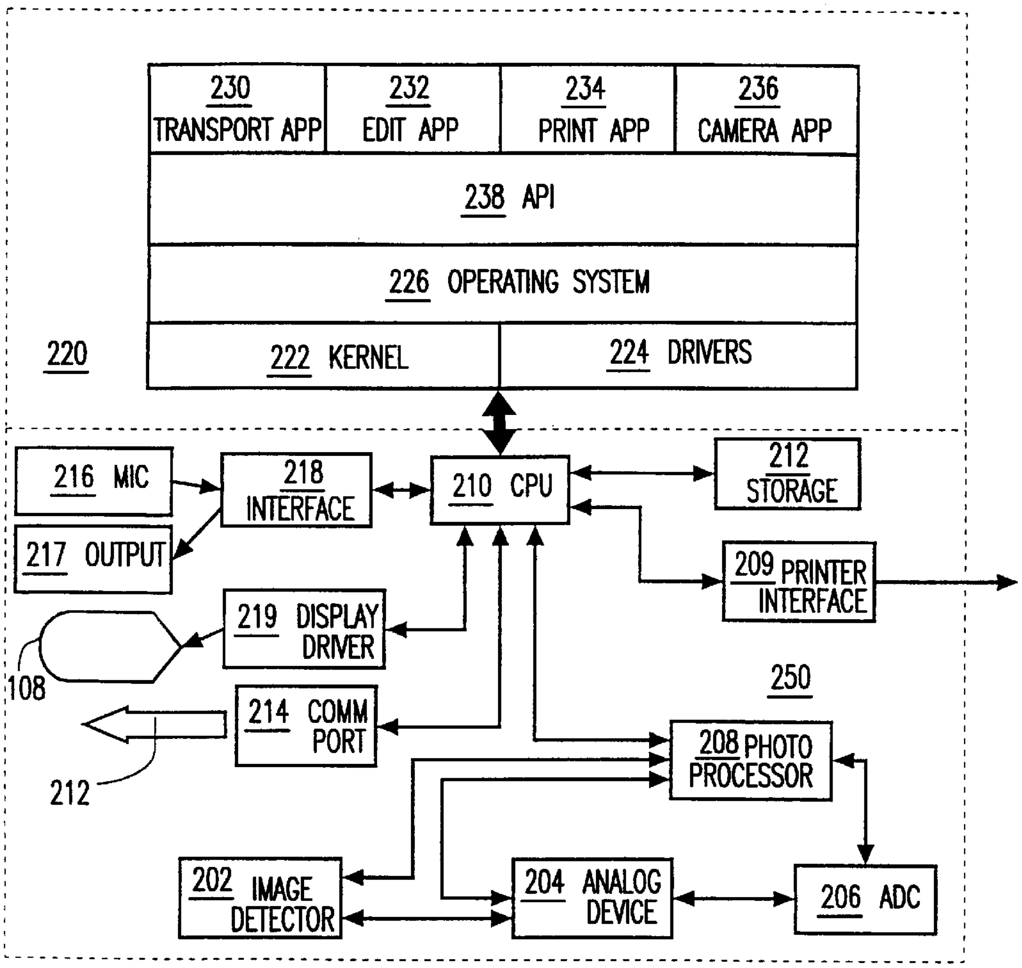
FIG. 2 is a block diagram of selected physical and logical components of a digital camera according to an embodiment.

FIG. 2 is a block diagram of selected physical and logical components of the digital camera 100 according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 produces a plurality of analog image signals that are generally proportional to the amount of light falling on the elements of the CCD. The analog image signals are coupled to an analog device 204, also called an analog chip or photo color device. The analog device 204 receives the signals from the CCD and organizes them into a discrete set of analog signals in a pre-determined amount. The analog device is coupled to an analog-digital converter (ADC) 206 that receives the analog signals from the analog device 204, and converts the analog signals into a plurality of digital signals. In preferred embodiments, the ADC 206 carries out 8-bit or 12-bit analog-to-digital conversion.

The ADC 206 provides its digital outputs to a photo processor 208. In a preferred embodiment, photo processor 208 is implemented as an application specific integrated circuit (ASIC) device that controls operational parameters of the image detector 202 and the analog device 204. The photo processor 208 may also buffer or groom the digital signals received from the ADC 206 to improve or modify image quality.

The photo processor 208 is coupled to a central processing unit (CPU) 210, which in one embodiment is a microprocessor having a 100 MHz clock cycle. The CPU 210 provides central control for other hardware elements 250 of the architecture 200 and executes software elements 220, as described below. The CPU 210 is coupled to one or more storage devices 212. For example, the CPU 210 is coupled to a flash memory card that provides non-volatile storage of digital images or photos taken by the digital camera.

The CPU is also coupled to input/output devices such as a communications port 214. For example, the CPU 210 is coupled to a telephone line 212 through a modem comprised of a coder/decoder (codec) and digital to analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical.

In the preferred embodiment, CPU 210 also is coupled to a microphone 216 through an appropriate interface 218. Preferably, the microphone 216 is mounted in or on the body 102 of the camera 100. The interface 218 converts analog voice signals received from the microphone 216 into a digital signal representative of the voice signals. The interface 218 enables the CPU 210 to receive, use and manipulate voice commands or voice message information spoken by a user of the digital camera into the microphone 216. The interface 218 preferably is also coupled to an output device 217. The interface can receive digitized audio information, convert it to analog form, pre-amplify the resulting analog signal, and drive the output device 217. In combination, the interface 218 and output device 217 enable the CPU 210 to play digitized audio files or voice messages in an audible way. The output device 217 is a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate points. In the preferred embodiment, the display device 108 has a touchscreen formed integrally with the display. In this embodiment, the display driver also includes circuitry or firmware for receiving signals from the touchscreen that represent user selection of elements shown in the display. Alternatively, a separate touchscreen driver circuit or chip is used.

In one embodiment, CPU 210 is also coupled to a printer interface 209 that connects to an external image-quality printer. Using printer interface 209, under program control, CPU 210 can command the printer to print a tangible copy of a stored photo. In the preferred embodiment, printer interface 209 communicates data to the printer using infrared light signals. Of course, any other type of printer interface can be used.

In another alternative embodiment, the CPU 210 is coupled to a hot-pluggable external interface. The hot-pluggable external interface enables the digital camera 100 to be connected to a docking station whereby the digital camera may communicate data and images to external computing devices, such as a personal computer.

The CPU 210 executes software elements 220. In the preferred embodiment, the software elements 220 of the architecture 200 are arranged in several logical levels. At the lowest logical level, the CPU 210 executes a kernel 222 and one or more drivers 224, which cooperate to control and supervise the hardware elements 250. For example, the drivers 224 include a driver program that controls and supervises operation of the image detector 202, the analog device 204, and the photo processor 208.

The CPU 210 executes an operating system 226. The operating system 226 is arranged at a logic level higher than the kernel 222 and drivers 224, so that the operating system 226 can use services embodied in the kernel and drivers. In the preferred embodiment, the operating system 226 is the Microsoft Windows CE operating system.

An application programming interface (API) 228 is logically interposed between the operating system 226 and one or more application programs 230–236. The API 228 provides an application programming interface (API) so that the application programs 230–236 may use services of the operating system 226, kernel 222 and drivers 224 by calling functions organized according to high-level abstractions. In this configuration, the application programs 230–236 are insulated from implementation details or intricacies of the operating system 226, kernel 222 and drivers 224. In the preferred embodiment, the API 228 provides functions accessible through function calls that express abstract program behavior and simplify application program development. For example, the API 228 provides functions for retrieving images, storing images, manipulating image elements, receiving or outputting information, and other functions.

In the preferred embodiment, the CPU 210 executes a transport application 230, an edit application 232, a print application 234, and a camera control application 236. Generally, the transport application 230 provides image transport functions, enabling a user of the digital camera 100 to send one or more stored pictures or images from the camera to one or more external addresses. The edit application 232 provides image editing functions, enabling a user of the digital camera 100 to edit, retouch, or alter one or more stored pictures or images while they are stored in the camera. The print application 234 provides image printing functions, enabling a user of the digital camera 100 to print one or more stored images directly from the camera to a printer. The camera control application 236 provides camera control functions, enabling a user of the digital camera 100 to adjust settings of the camera, such as the exposure time, flash on/off, zoom, whether manual focus or autofocus is enabled, red eye removal, flash fill, exposure intensity, etc. In alternate embodiments, other application programs are executed.

In alternative embodiments, the software elements 220 are implemented in the form of firmware or hardwired circuitry that carries out the functions described herein. Implementation in software in this arrangement is not required. Preferably, a user of the digital camera 100 selects and activates one of the application programs 230–236 by choosing an icon representing the desired application program from a display shown on the display device 108.

Interpolation Method

Figure 3A:
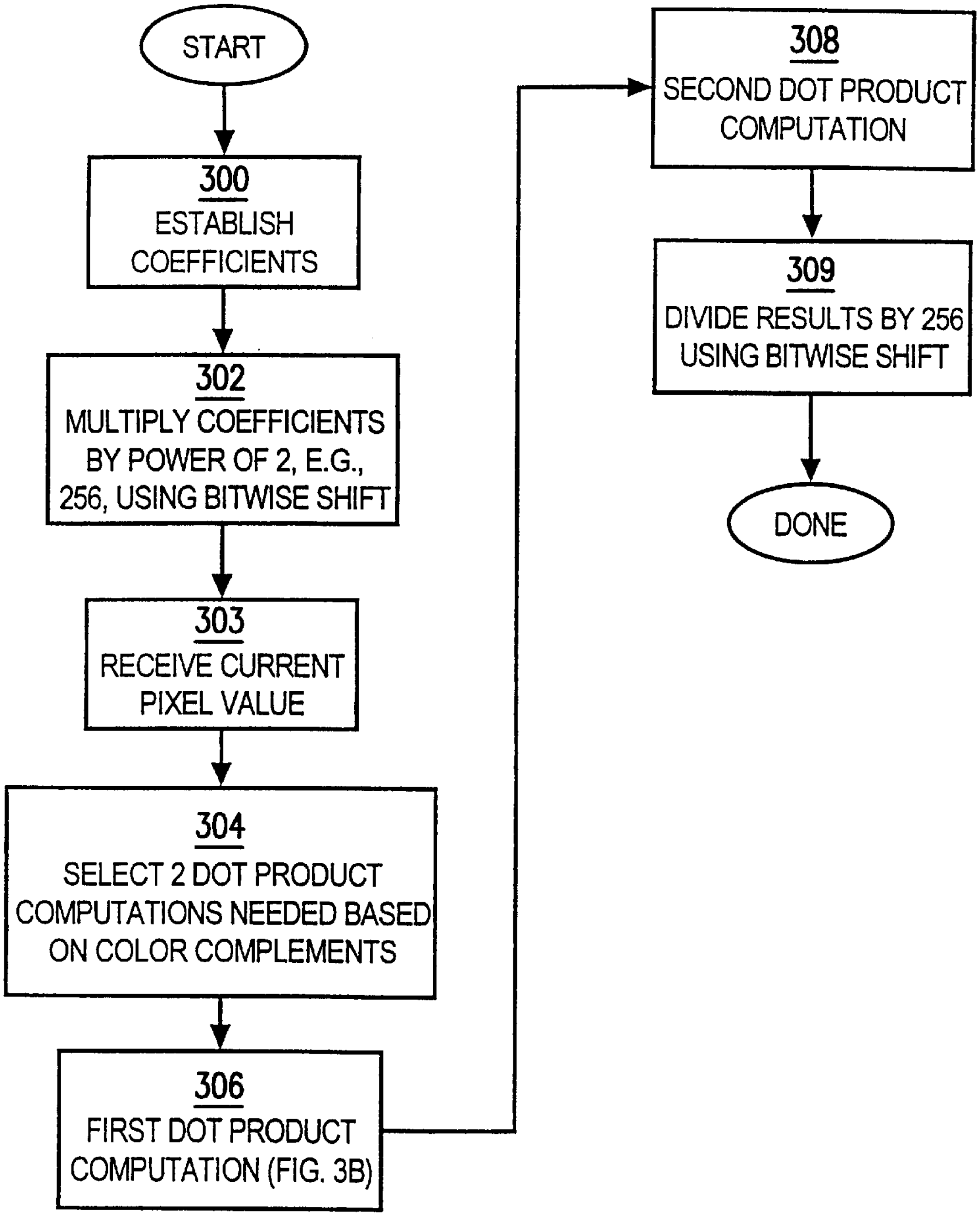
FIG. 3A is a flow diagram of a process of interpolating color information of a pixel based on color information of neighbor pixels.

FIG. 3A is a flow diagram of an improved method of interpolating, for a first pixel of interest that is associated with a first color value, pixel information comprising a second color value and a third color value. FIG. 3A is intended to reflect a process that is repeated or iterated for each pixel ("current pixel" or "pixel of interest") that is received at a processor from a color area sensor, such as a CCD sensor. Generally, the process provides an improved method of interpolating values of two colors that complement the color represented by the current pixel. For purposes of example and explanation, the discussion of FIG. 3A will assume that a bicubic interpolation approach is used with a 7-by-7 array of neighboring pixels that surround a center pixel of interest. However, a 7-by-7 array is not required, and any number of neighboring pixels may be used in a similar approach.

In block 300, coefficients are established. Block 300 may involve creating and storing, in a digital memory, computer memory or related device, one or more coefficient values that reflect the relative contribution of a particular neighbor pixel to the current pixel. In one embodiment, block 300 is implemented by storing four (4) arrays, each of which is seven (7) elements by seven (7) in size, of coefficient values. Each of the four (4) arrays corresponds to the second and third color values that are needed to be calculated given a current pixel of a particular first color. The reason for using four (4) arrays is explained further below.

In block 302, each of the coefficient values is multiplied by a power of "2." Preferably, the remaining fractional part of each coefficient value is truncated. In the preferred embodiment, the multiplication operation may be carried out by instructing the CPU to carry out a first shift operation. For example, when the power of "2" is the value "256", each coefficient may be shifted left by 8 bits.

Any suitable power of "2" may be selected. An excessively small power of "2" will result in loss of precision in the subsequent calculations. An excessively large power of "2" will result in over-precision which can over-burden the CPU in later operations. Values between "64" and "512" are generally expected to be most suitable.

In one embodiment, the steps of block 300 and block 302 are combined by selecting coefficient values that are integer powers of "2", or the sum of two or more integer powers of "2", such as "16", "−4", "20", etc. The values that are selected are stored in four (4) 7-by-7 arrays using appropriate data structures under control of appropriate software elements.

In block 303, a value of the current pixel is received. In one embodiment, block 301 involves receiving, at a CPU, a value of the next pixel that is output by a color area sensor and after the pixel is subjected to photo-response non-uniformity ("PRNU") processing. PRNU processing is a method of correcting the actual pixel value produced by the sensor to account for variances in color responsiveness of the semiconductor materials that make up the sensor.

In block 304, the process selects two (2) of the four (4) arrays that are necessary to compute pixel values for the two colors that complement the color represented by the current pixel. For example, if the current pixel represents a Blue color value, then the arrays corresponding to Red and Green are selected. Four (4) arrays are required due to slight differences in the patterns of colors of neighboring pixels depending on the color represented by the current pixel. Although there are six (6) cases or permutations of colors that may appear to require computation, in fact only four (4) arrays and four (4) different computations are needed. The six (6) permutations are:

1. When the current pixel is Blue, the process needs to calculate a Green pixel value.
2. When the current pixel is Blue, the process needs to calculate a Red pixel value.
3. When the current pixel is Red, the process needs to calculate a Blue value.
4. When the current pixel is Red, the process needs to calculate a Green value.
5. When the current pixel is Green, the process needs to calculate Red.
6. When the current pixel is Green, the process needs to calculate Blue.

However, the pattern of neighboring pixels, and therefore the pattern of values of coefficients, is the same for case 2 ("at Blue, calculating Red") and case 3 ("at Red calculating Blue"). Also, the pattern of values of coefficients is the same for case 1 ("at Blue, calculating Green") and 4 ("at Green, calculating Blue") because the pattern of Green neighbors is the same in both cases. Thus, in the above list, only case 1, case 2, case 5, and case 6 are unique.

In block 306, a first dot product computation is carried out. Assume that the current pixel value represents Blue, so that the process has selected operations to calculate Green and Red values in block 304. In this example, block 306 would involve carrying out a dot product computation to determine the Green value. A second dot product computation is separately carried out to determine the Red value, as shown by block 308. The term "dot product" is used because block 306 involves, in effect, multiplying the value of the current pixel value by the value of each element of the "at Blue, computing Green" array that corresponds to a Green neighbor pixel. In embodiments of the present invention, however, CPU multiply operations arc not used to carry out the dot product computation.

Figure 3B:
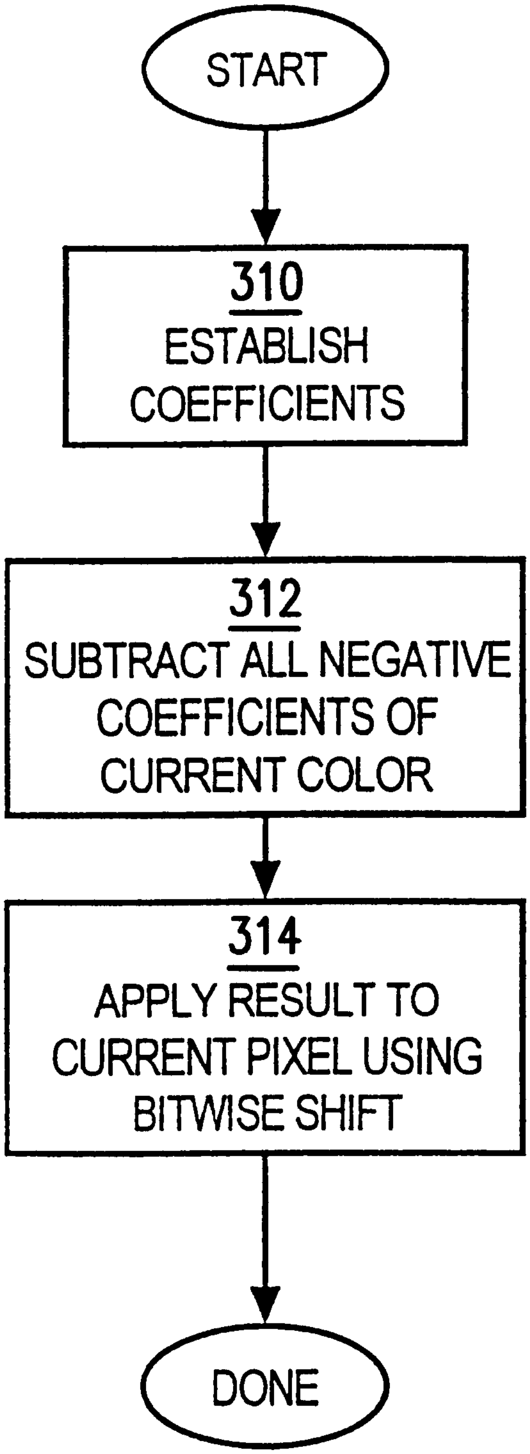
FIG. 3B is a flow diagram of steps in a sub-process of the process of FIG. 3A.

FIG. 3B is a flow diagram of a process that may be used to carry out the dot product computation. In block 310, the process adds all non-zero, positive coefficients in the "at Blue, computing Green" array that correspond to Green neighbor pixels. From this sum, in block 312, the process subtracts all non-zero, negative coefficients from the same array that correspond to Green neighbor pixels. This results in a single value ("net value") that represents the net Green contribution of all Green neighbor pixels.

In block 314, the net value is applied to the current pixel value to result at a scaled color value for the current complementary color that is being calculated. For example, in the case of block 306, the net value is applied to the current pixel value, resulting in a scaled value for the Green pixel value that complements the current pixel. In the preferred embodiment, the net value is applied without using a CPU multiply operation, for example, using a bitwise shift operation. Thus, the current pixel value is shifted by a number of bits equal to the square root of the net value. For example, if the net value is "64", the current pixel value is shifted 8 bits. If the net value is "4", then the current pixel value is shifted "2" bits. In one embodiment, if the net value is less than a pre-determined minimum value, or greater than a pre-determined maximum value, then the net value is set equal to the predetermined minimum value or maximum value, as appropriate.

In block 309, the resulting shifted current pixel value is then divided by 256, which may be carried out using a second shift operation that is complementary to the first shift operation.

Preferably, all operations are carried out on image data that resides in SDRAM.

Advantageously, no CPU multiply operations are used, greatly speeding the process. No floating-point operations are required, as in past approaches. When the coefficients having values from "0" to "1" are multiplied by 256, and the fractional part is truncated, the coefficients each have an integer value from −256 to +256. Such values may be represented in memory in 8-bit storage locations, unsigned.

Further, in the preferred embodiment, the values of most or many of the coefficients are selected to be either a power of "2", for example, "16" or "64", or two powers of "2" added together, for example, "20" (16+4). Since only shift operations are used, the entire approach can be implemented in integrated circuits or similar hardware devices, ensuring fast processing.

For example, each non-zero pixel contribution value or coefficient is fed to a processing module implemented in hardware. Array elements that have a value of "16" are added together and bit shifted by 4 bits. Array elements that have a value of "20" are added together and bit shifted by 4 bits, added again and bit shifted by 2 bits. To carry out a dot product, all positive terms may be added, all negative terms may be added, and the negative terms are subtracted from the positive terms. The entire dot product may be computed in combinational logic without multiply operations.

As a result, complementary color values may be interpolated in a very fast approach. Currently available digital cameras have CCD sensors that have approximately 2 million pixels. For each pixel, in prior approaches there would be 24–40 multiply operations, and about 30 add operations. This would require many millions of operations to be carried out by a low-end processor in a digital camera, creating a significant image processing bottleneck. The present approach is far faster. For example, through simulation, a past approach has been found to require 10–12 seconds per image based on 2 million pixels. The present approach has been found to take less than 1 second per image.

APPENDIX 1 sets forth an example of a hardware device that implements one embodiment of the invention, expressed in the Verilog hardware simulation language.

Interpolation Circuit Architecture

1. STRUCTURE

Figure 7:
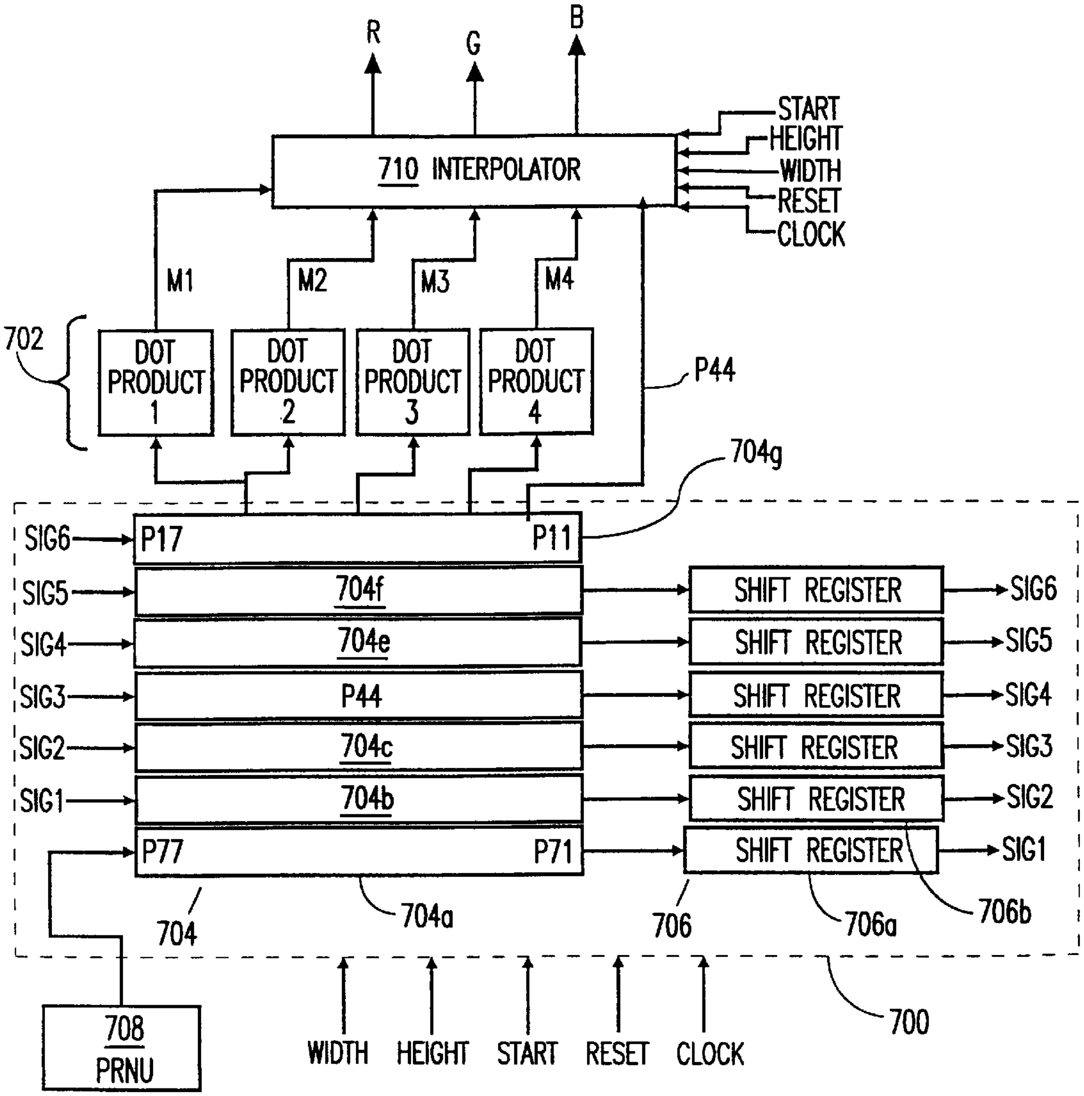
FIG. 7 is a block diagram of an embodiment of an image interpolation circuit.

FIG. 7 is a block diagram of an embodiment of an architecture for an electronic circuit or a semiconductor device that may carry out image interpolation. In an embodiment, the architecture disclosed herein may form a part of one or more integrated circuits that make up a digital camera. For example, the architecture of FIG. 7 may form a part of the photo processor 208 of FIG. 2. The architecture may be implemented in a field programmable gate array (FPGA) chip or in an application-specific integrated circuit (ASIC) for a digital camera application.

Figure 5:
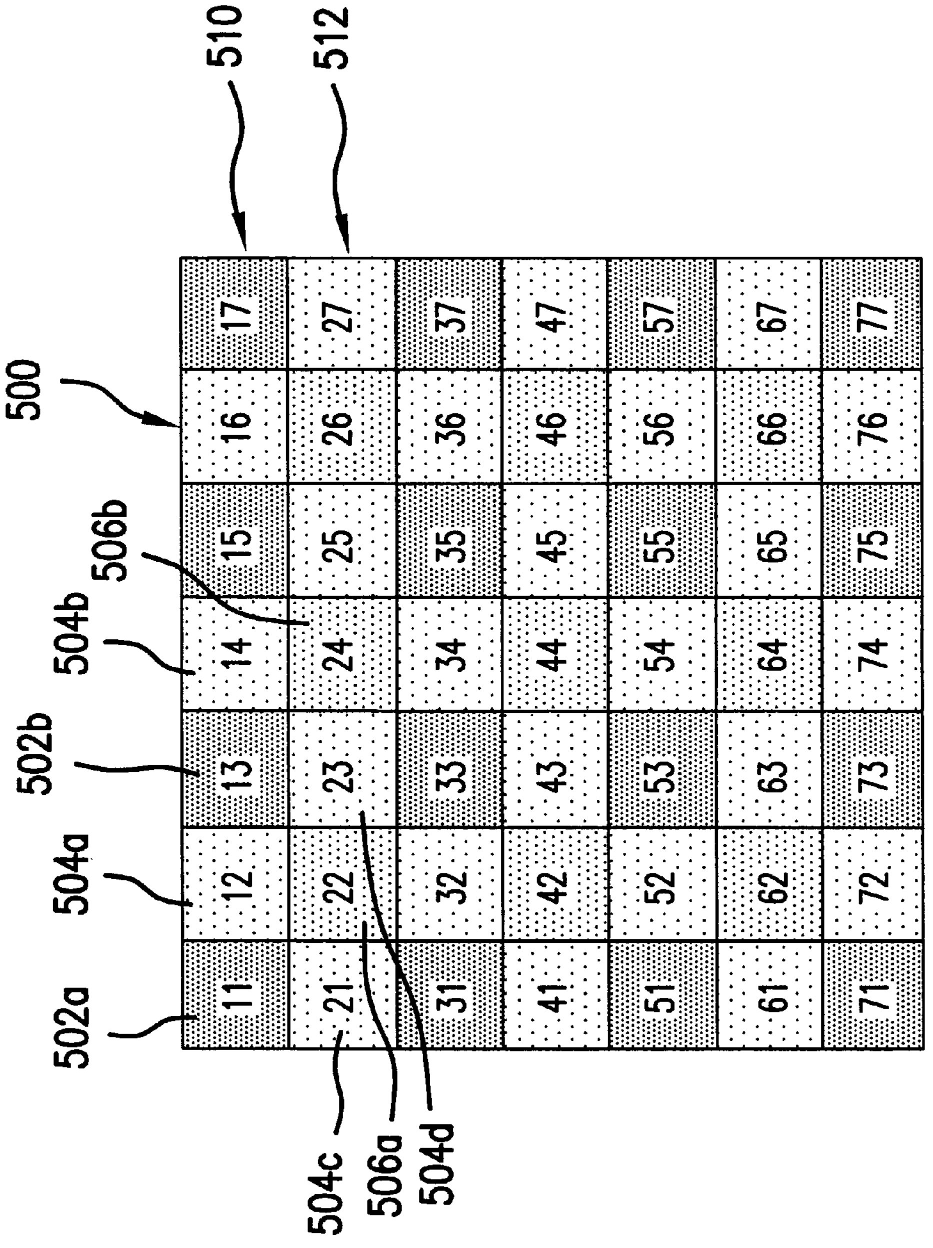
FIG. 5 is a diagram that schematically illustrates a color pixel pattern of an example sensor device.
Figure 6:
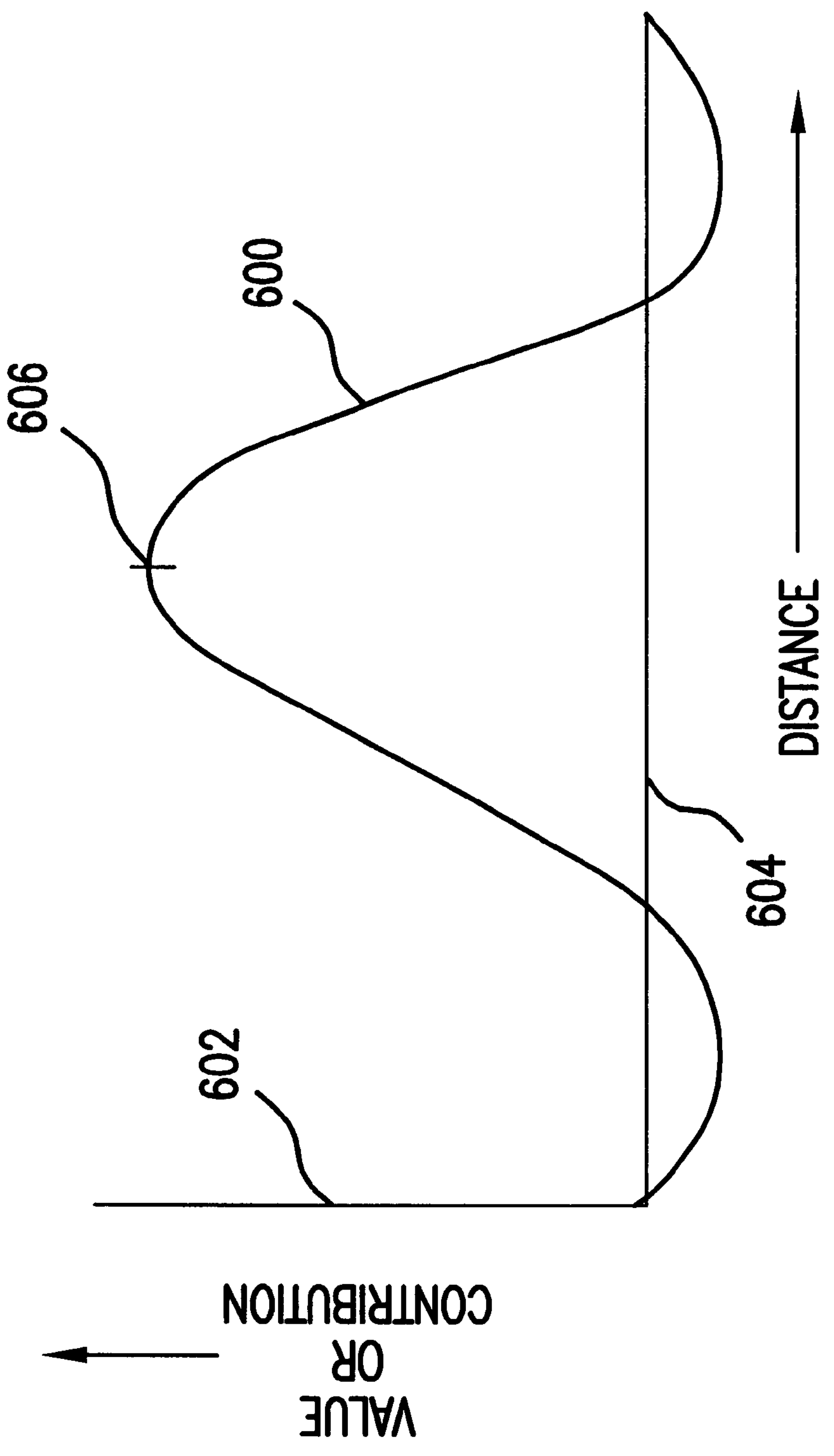
FIG. 6 is a graph of relative contributions of neighbor pixels.

Generally, the architecture comprises a storage module 700, dot product modules 702, and interpolator module 701. Storage module 700 generally comprises a register array 704 serially coupled to a plurality of shift registers 706. Register array 704 may comprise a 7-by-7 matrix of registers organized in seven lines 704*a*, 704*b*, 70*c*, etc. Each register is designated in FIG. 7 with a reference numeral in the range P11 to P77 that corresponds to the reference numerals of FIG. 5. Each register stores a pixel value, such as an 8-bit quantity, 12-bit quantity, etc.

The size of the register array 704 corresponds to the number of values that are needed by other elements of the system to carry out image interpolation. In this example, a 7-by-7 matrix is shown because it corresponds to a bicubic interpolation approach that uses a 7-by-7 matrix of neighbor pixel values that surround a pixel of interest. However, any other size of matrix may be used.

Six of the register lines, namely register lines 704*a*–704*f*, are linearly coupled to corresponding shift registers 706*a*–706*f*. Each shift register 706*a*–706*f* comprises a plurality of buckets, in which each bucket that corresponds to one value of the sensor array. Thus, each shift register in its entirety corresponds to one line of pixel values that are received from the sensor array. Each shift register may be implemented as a linear set of registers, in which the number of registers is as large as the largest expected CCD sensor line. Typically, each shift register comprises 1024 to 3000 individual registers, each of which can store an 8-bit value or a 12-bit pixel value. The particular structure is not critical. In an alternate embodiment, each shift register is structured as the number of pixels in a line of the sensor, less 7.

Each of the shift registers 706*a*–706*f* generates an output signal SIG1, SIG2, etc. that is coupled to an input of a corresponding next higher register line of the register array 704. For example, output signal SIG1 of the first shift register 706*a* is coupled to a corresponding input of the second register line 704*b* of register array 704. Likewise, output signal SIG2 of second shift register 706*b* is coupled to input SIG2 of third register line 704*c*.

The signals SIG1–SIG6 indicate that values shifted along the shift registers are automatically moved to the first register in an associated register line. Thus, when a value stored in the last bucket of second shift register 706*b* is shifted right, the value is automatically moved to and stored in the first register P57 of third register line 704*c*. Values in the shift registers 706 are shifted as the CLOCK signal is clocked.

Values stored in all registers of register array 704 are coupled to and continuously available to be read by dot product modules 702. In the preferred embodiment, four dot product modules are provided, as indicated by Dot Product 1, Dot Product 2, Dot Product 3, and Dot Product 4 of FIG. 7. Each of the dot product modules 702 corresponds to one of the four (4) cases or permutations described above in connection with block 304 of FIG. 3.

The term "dot product" is used to refer to dot product modules 702 only for convenience to generally suggest the function carried out by the modules. An actual dot product operation need not be carried out; equivalent processes may be used. For example, the architecture may be used to implement the bitwise shift and add operations described above.

Preferably, however, only those registers of register array 704 that are needed by a particular dot product module are coupled to that dot product module. For example, the preceding description notes that when interpolation is carried out for a Blue pixel, there are twenty-four (24) non-zero Green neighbor values that are considered. Accordingly, Dot Product 1 is coupled by twenty-four (24) bundles of lines to the twenty-four (24) registers of register array 704 that correspond to the non-zero Green neighbor values that need to be considered by Dot Product 1. Each bundle of lines comprises one line for each bit of a stored value, for example, 8 lines for 8-bit values, 12 lines for 12-bit values, etc.

Similarly, Dot Product 2 is coupled by sixteen (16) bundles of lines to the sixteen (16) registers of register array 704 that correspond to the non-zero Blue or Red neighbor values that need to be considered by Dot Product 2. Dot Product 3 is coupled by sixteen (16) bundles of lines to the sixteen (16) registers of register array 704 that correspond to the non-zero Red neighbor values that need to be considered by Dot Product 3. Dot Product 4 is coupled by twelve (12) bundles of lines to the twelve (12) registers of register array 704 that correspond to the non-zero Red neighbor values that need to be considered by Dot Product 2.

Each of the dot product modules 702 produces an output on lines M1, M2, M3, M4, representing a value for one of the two colors that complement the color represented by value P44. Output lines M1–M4 are coupled to Interpolator 710 for use in computing interpolated Red, Green and Blue values. Interpolator 710 also separately receives the value of pixel P44 on a discrete line, since pixel P44 is the center pixel of interest and its value is not used in computations of the dot product modules 702. Thus, Interpolator 710 produces, as final output each time that it is clocked, a Red value, Green value, and Blue value on lines R, G, B respectively. The R, G, B values may be fed to another circuit or module for use in generating a digital image.

Interpolator 710 also receives START, HEIGHT, WIDTH, RESET, and CLOCK signals. The START signal acts as a trigger to notify Interpolator 710 that pixel data has started arriving at register array 704. START is asserted at the same time that the first pixel value arrives at position P77 of the 7 by 7 array. The Interpolator 710 then knows that each clock signal means that one pixel value has shifted across register array 704. Interpolator 710 maintains a pixel counter that is incremented with each clock signal until RESET is asserted. The Interpolator 710 is also wired with a selection mechanism that determines which of the dot product modules 702 to pick depending on the current pixel counter value. Accordingly, the Interpolator can count clock signals and then select the correct two dot product modules 702 for the two colors that are complementary to the color represented by the current pixel P44.

The HEIGHT and WIDTH signals provide the actual height and width, in pixels, of the sensor that is being used. These signals enable Interpolator 710 to determine the color represented by a particular clock pulse, and therefore, which of input lines M1, M2, M3, M4 to select for use in generating R, G, and B values. The RESET signal may be used to reset internal circuitry of Interpolator 710 prior to working on a new image.

Figure 8A:
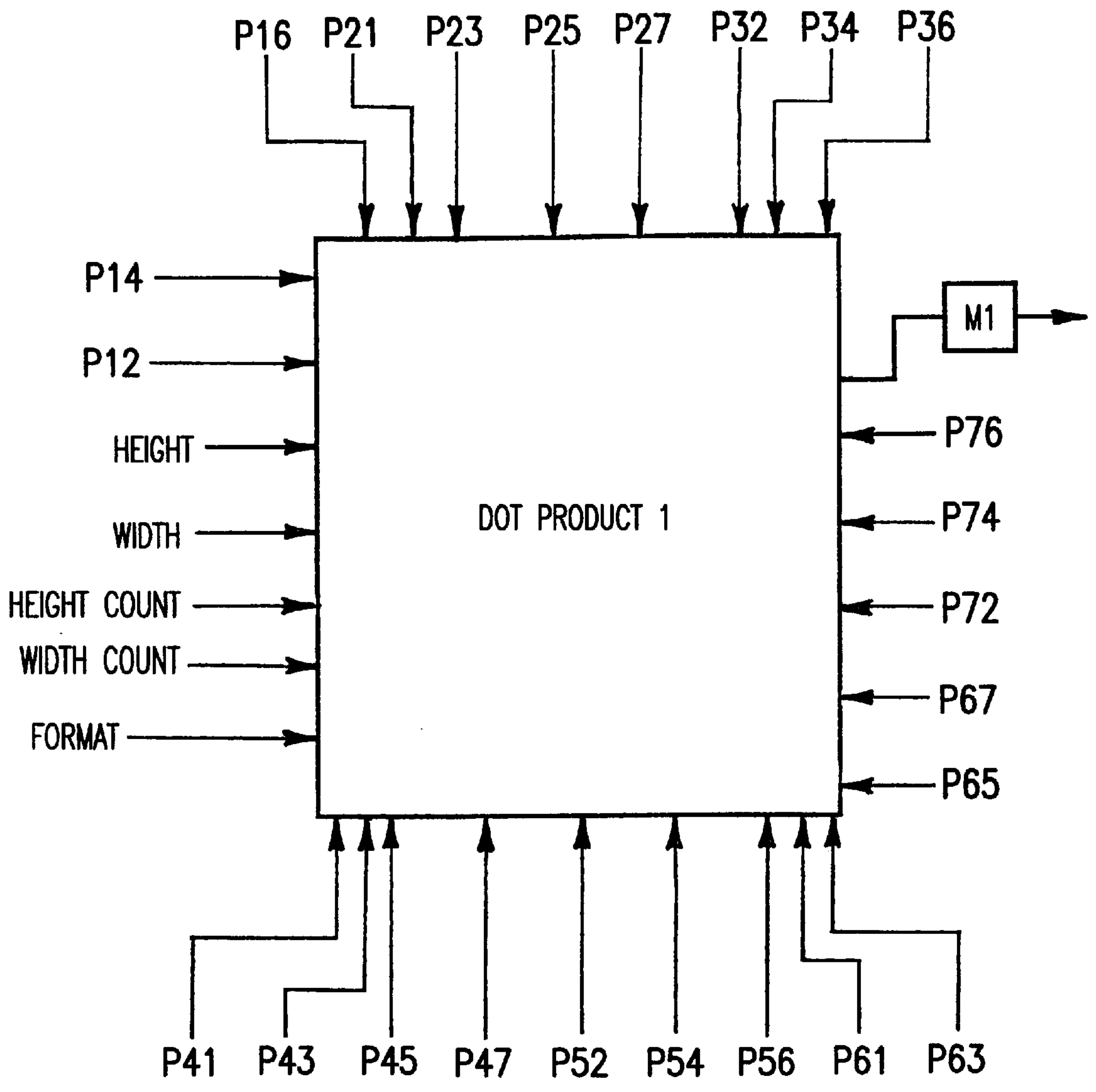
FIG. 8A is a block diagram of an embodiment of a first dot product processor.

FIG. 8A is a block diagram of the stricture of Dot Product 1. Dot Product 1 produces a Green output value when the center pixel represents a Blue or Red value. Dot Product 1 receives Height and Width signals that respectively represent the height and width of the sensor in pixels. Dot Product 1 also receives Height Count and Width Count signals that represent the current position of the center pixel P44 within the sensor array. A Format signal indicates whether each pixel is stored in 8, 10, or 12 bits, or some other size. Dot Product 1 also receives pixel values from pixels at positions P12, P14, P16, P21, P23, P25, P27, P32, P34, P36, P41, P43, P45, P47, P52, P54, P56, P61, P63, P65, P67, P72, P74, P76 of register array 704, and produces output M1. Dot Product may be implemented in combinatorial logic circuitry such that the output M1 of Dot Product 1 is defined by:

$$M1=((P23+P25+P32+P36+P52+P56+P63+P65)<<4+(P34+P43+P45+P54)<<6$$

$$-(P12+P16+P21+P27+P61+P67+P72+P76)<<2-(P12+P16+P21+P27+P61+P67+P72+P76)<<1$$

$$-(P14+P41+P47+P74)<<4-(P14+P41+P47+P74)<<2)>>8$$

In this definition and the other dot product definitions set forth in this document, the symbol "<<" and the symbol ">>" indicate a bit shift operation.

Figure 8B:
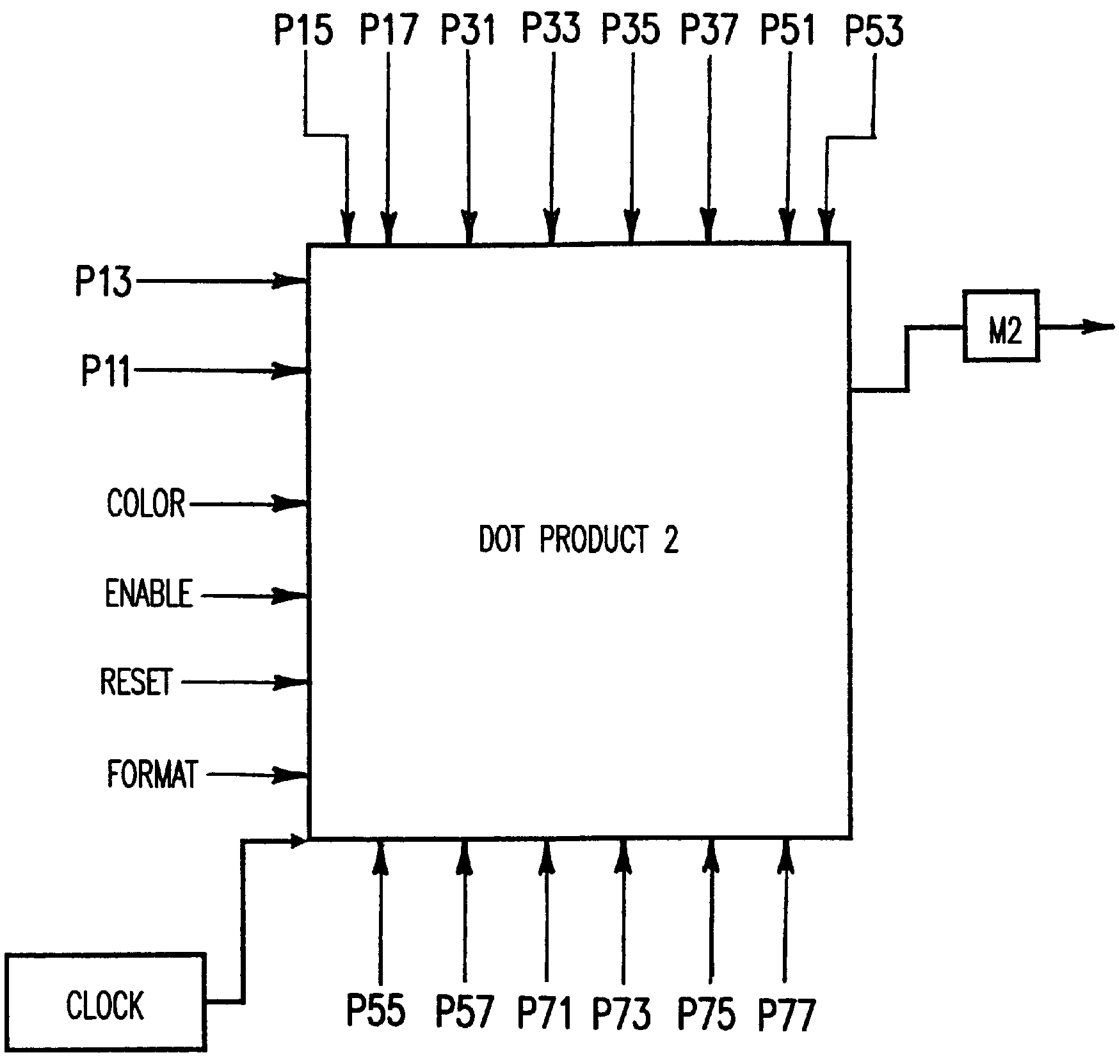
FIG. 8B is a block diagram of an embodiment of a second dot product processor.
Figure 8C:
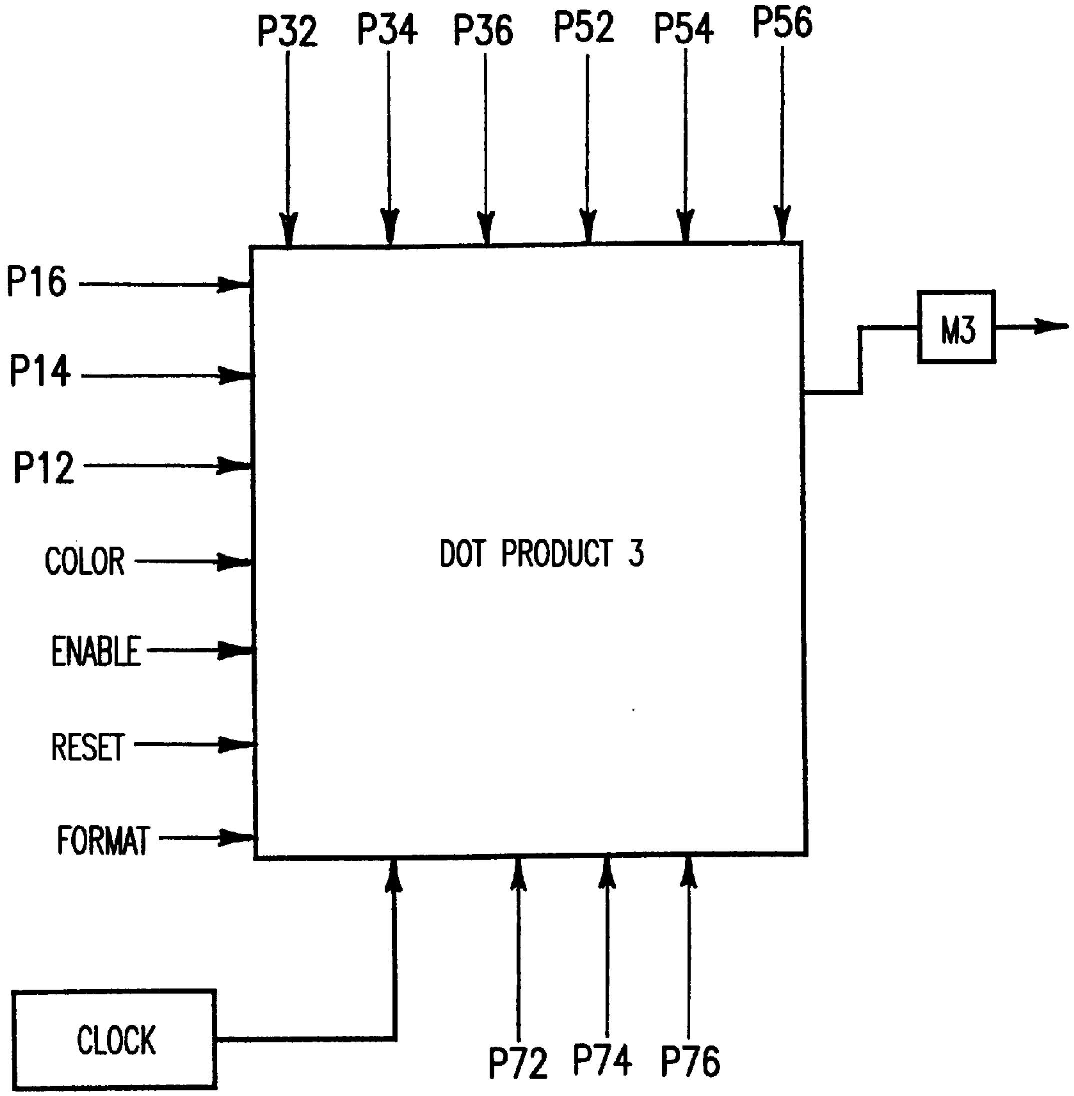
FIG. 8C is a block diagram of an embodiment of a third dot product processor.
Figure 8D:
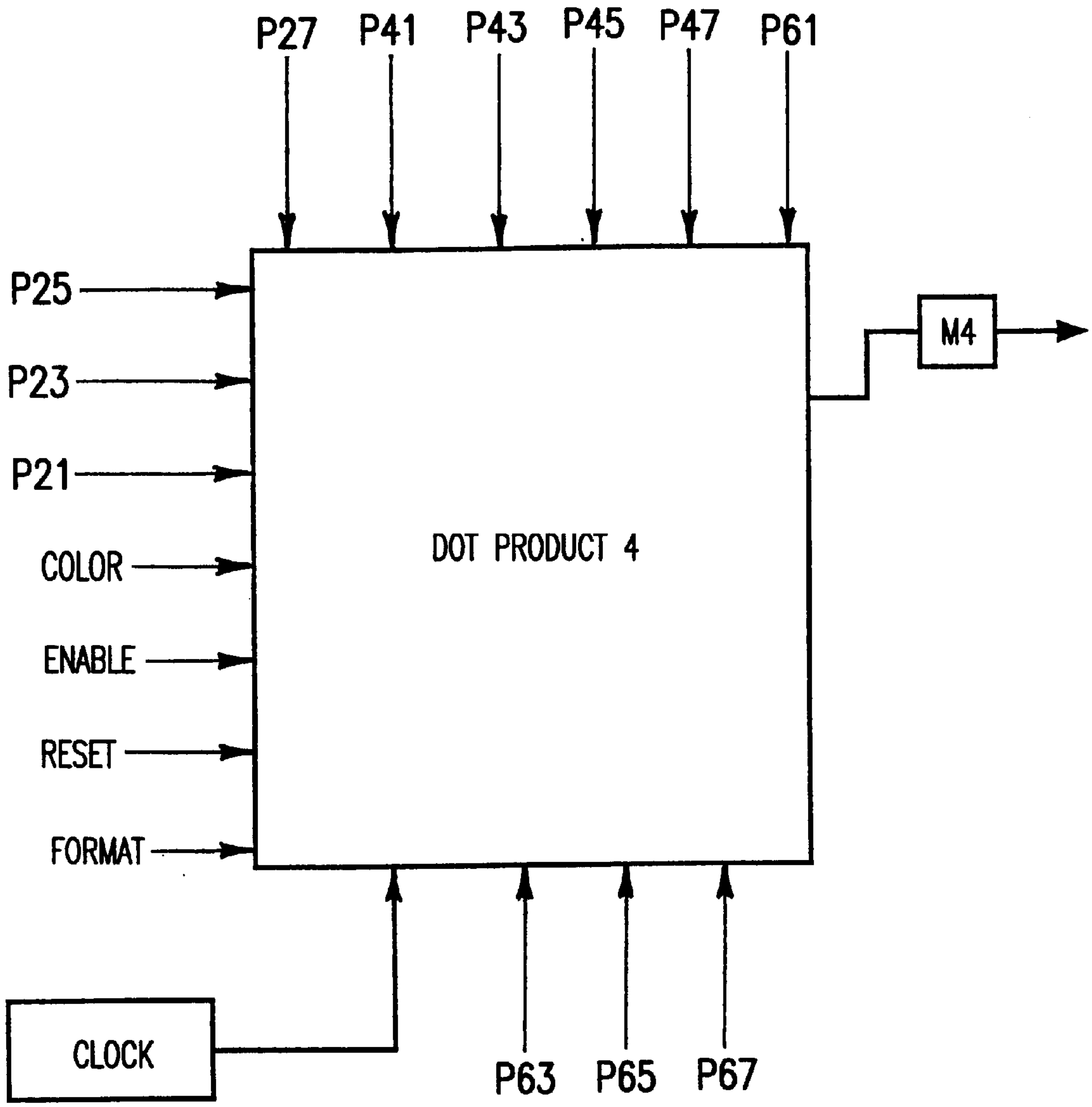
FIG. 8D is a block diagram of an embodiment of a fourth dot product processor.

FIG. 8B is a block diagram of Dot Product 2. Dot Product 2 produces a value representing a Red value when the center pixel is a Blue value, or a Blue value when the center pixel is a Red value. Dot Product 2 receives Color, Enable, Reset, and Format signals. The Color signal identifies which color as at the center of the array, and its location among the possible colors. The Enable signal is asserted when Interpolator 710 selects Dot Product 2 to provide an output. The Reset signal indicates that a new image is starting, and causes all registers to clear. Dot Product 2 receives input signals representing pixel values P11, P13, P15, P17, P31, P33, P35, P37, P51, P53, P55, P57, P71, P73, P75, and P77. The output M2 of Dot Product 2 is defined by:

$$M2=((P11+P17+P71+P77)<<4+(P33+P35+P53+P55)<<7$$

$$+(P33+P35+P53+P55)<<4-(P13+P15+P31+P37+P51+P57+P73+P75)<<5$$

$$-(P13+P15+P31+P37+P51+P57+P73+P75)<<4)>>8$$

Dot Product 3 generates a Red output value when the center pixel represents a Green value in a line of pixels that represent values for the alternating color pattern Green, Blue, Green, Blue. Dot Product 3 also is used to generate a Blue output value when the center pixel represents a Green value in a Blue, Green, Blue, Green line. Dot Product 3 receives Color, Enable, Reset, and Format signals that carry out the same functions as described above in connection with Dot Product 2. Dot Product 3 also receives input signals representing pixel values P12, P14, P16, P32, P34, P36, P52, P54, P56, P72, P74, and P76. The output M3 of Dot Product 3 is defined by:

$$M3=((P32+P36+P52+P56)<<5+(P34+P54)<<7$$

$$-(P12+P16+P72+P76)<<3-(P12+P16+P72+P76)<<1$$

$$-(P12+P16+P72+P76)-(P14+P74)<<5$$

$$-(P14+P74)<<3-(P14+P74)<<1)>>8$$

Dot Product 4 generates a Red output value when the center pixel represents a Green value in a Blue, Green, Blue, Green line. Dot Product 4 may also be used to generate a Blue output value when the center pixel represents a Green value in a Green, Blue, Green, Blue line. Dot Product 4 receives Color, Enable, Reset, and Format signals that carry out the same functions as described above in connection with Dot Product 2. Dot Product 4 also receives input signals representing pixel values P21, P23, P25, P27, P41, P43, P45, P47, P61, P63, P65, P67. The output M4 of Dot Product 4 is defined by:

$$M4=((P23+P25+P63+P65)<<5+(P43+P45)<<7$$

$$-(P21+P27+P61+P67)<<3-(P21+P27+P61+P67)<<1$$

$$-(P21+P27+P61+P67)-(P41+P47)<<5$$

$$-(P41+P47)<<3-(P41+P47)<<1)>>8$$

Each of the dot product modules 702 may include a comparator that compares the sum of the positive elements with the sum of the negative elements. If the sum of the negative elements is larger, then M1 is set to zero. Also, if the result is larger than the maximum allowable pixel value, then the output is set to that value.

2. OPERATION

In operation, corrected pixel data is coupled from a PRNU module 708 to the first register P77 of first register line 704*a* of register array 704. Each register P11–P77 is linearly coupled to the next rightmost register in the register array 704, and operation of the registers is coordinated with a CLOCK signal that is applied to storage module 700. Thus, each time that the storage module 700 is clocked, the value stored in each register is transferred to the next rightmost register. For example, the value in register P77 moves successively to register P76, P75, etc. until it reaches register P71. When the end of a register line 704*a*–704*g* is reached, clocking storage module 700 causes the value in the last register to move to the first register one of the shift registers 706. Thus, the value in register P71 would move the first bucket of shift register 706*a*.

Subsequent clock signals cause each value in a shift register to move successively along the shift register until the last bucket is reached. At that point, in response to a clock signal, a signal SIG1–SIG6 is generated and the value in the last bucket is moved to the first register of the next higher register line. For example, when storage module 700 is clocked, the value stored in the first bucket of shift register 706*a* is moved successively rightward until it reaches the last bucket. The next clock signal causes the value to move to register P67 of register line 704*b*.

When Interpolator 710 receives the START signal, Interpolator 710 then knows that each clock signal means that one pixel value has shifted across register array 704. Interpolator 710 increments its pixel counter with each clock signal. Interpolator 710 determines which of the dot product modules 702 to use depending on the current pixel counter value, i.e., for the two colors that are complementary to the color represented by the current pixel P44. Those two color values, plus the current pixel color value, become the final Red, Green, Blue values and are clocked to the next module.

The R, G, B outputs of Interpolator 710 are always active. However, only two outputs M1–M4 represented a needed value at any given time, whereas P44 is always one R, G, B component of a pixel. The selection mechanism of Interpolator 710 determines which signal M1–M4 to send to the next module.

In the preferred embodiment, the architecture is wired so that pixels of a sensor that are unused ("dead") are ignored. Many sensors include a section of "cleanout" bits on the sides of the horizontal shift register. In a region inward of the cleanout bits, the sensors typically also have extra pixels that are not used by the sensor. Thus, each horizontal line of pixel data may include cleanout bits, unused pixel values, then good pixel values across a complete line of the sensor, then unused pixel values at the other side, then cleanout bits at the other side. When the sensor is delivering values for the cleanout bits and the unused pixels, the architecture of the preferred embodiment is idle.

Special processing is carried out when the architecture is used for interpolation of color values for pixels that are located at or near the edge of the sensor. For example, when a 7-by-7 interpolation array is used, the array cannot be filled with data for center pixels that are located four (4) or fewer pixels of the edge of the sensor. In such "edge cases," computing an output is desired, even when parts of the array of values are missing. In the preferred embodiment, the available data is copied or "mirrored" into the corresponding positions of the array that are missing usable data.

3. ADVANTAGES

In this configuration, the registers can be wired together so that values are moved among them on successive clock cycles. The values stored in the registers are always local and available for use by dot product modules 702. All calculations of dot product modules 702 may be done using values stored momentarily in the register array 704, even while new pixel data is moving through at the clock speed of the sensor. Thus, the circuitry need only operate at the clock speed of the sensor, and no memory lookup operations are required.

The architecture provides a way to continuously keep available an array of values that are used in an interpolation transform operation, without operating at a frequency or shifting data any faster than the pixel data input rate. As a result, the interpolation calculation for the center pixel can be done using matrix multiplication, or shift-and-add operations, in one sensor clock cycle. The architecture produces RGB values for each pixel of a sensor in real time, with no large storage requirements and no high-performance processing requirements.

The architecture is useful with virtually any image processing algorithm or method; it is not limited to bicubic interpolation. Any process that involves a 2D data convolution or transformation may be carried out. For example, the architecture may be used in filtering applications, wavelet processing, etc.

The architecture is well-suited to implementation in combinational logic, so that clock delay or latency do not occur. Performance of the architecture does not vary in any way depending on the magnitude of the value of any particular pixel; the value is simply clocked through various gates to arrive at a result. The architecture is particularly well-suited to use with the method described above in connection with FIG. 3A and FIG. 3B. Such a method primarily uses shifts and adds to carry out interpolation computations, so that it can be implemented in the combinational logic of the above-described architecture.

General Purpose Computer Hardware Overview

Figure 4:
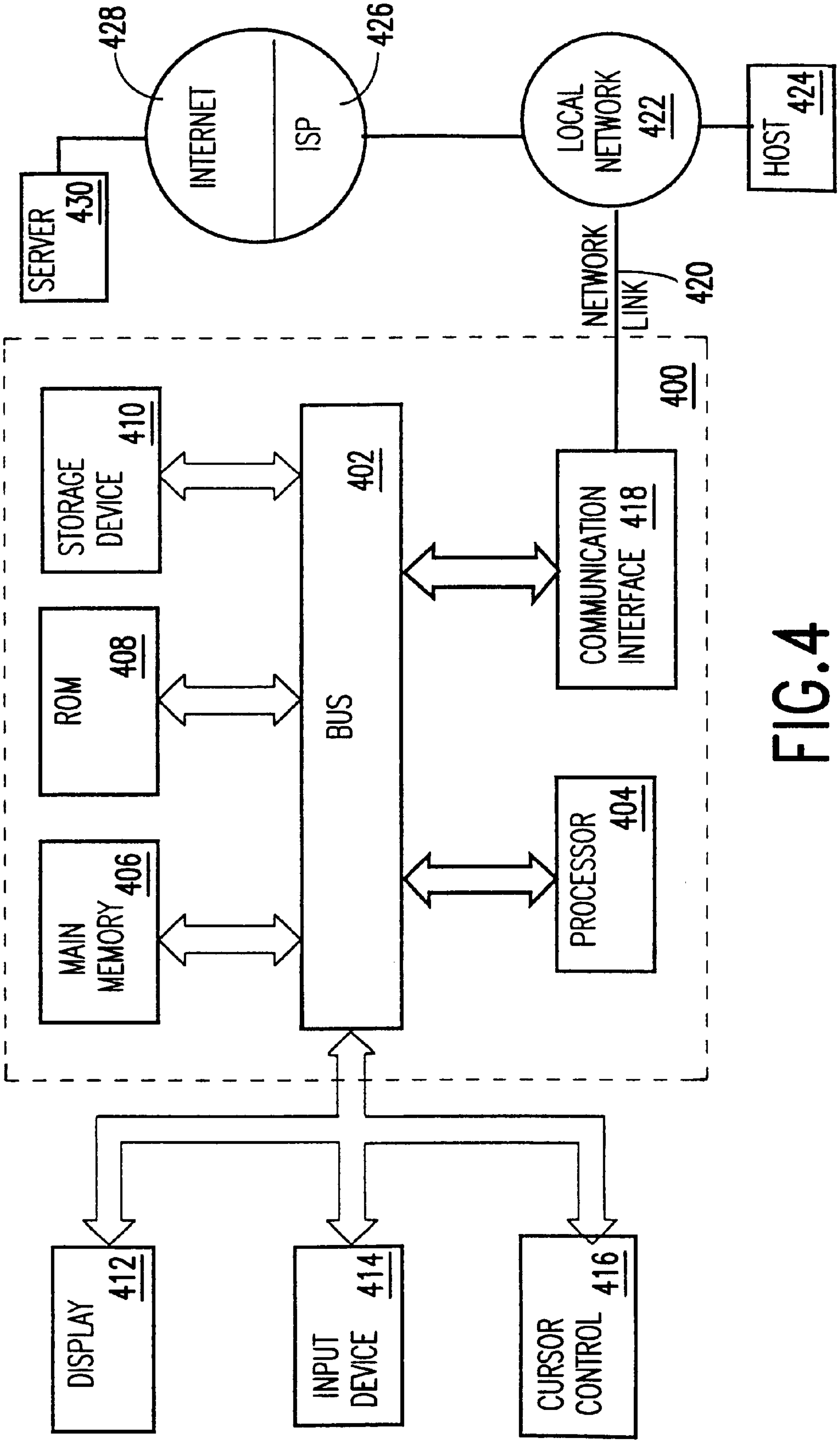
FIG. 4 is a block diagram of a computer system on which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for interpolating image information. According to one embodiment of the invention, interpolating image information is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for interpolating image information as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An image processing circuit that generates a plurality of color values each representing color components of a pixel of a digital image, the circuit comprising:

a register array that is organized in a plurality of lines of registers and that represents a portion of an array of pixels of the digital image;

a plurality of shift registers, in which each of the shift registers is coupled to receive an input from one of the lines of registers and to shift said input to another one of the lines of registers;

a plurality of dot product modules, each coupled to the register array, each of which generates an interpolated color value based on the register array; and an interpolator module configured to receive image data values stored in the register array into the dot product modules, select at least one of the dot product modules for use in generating one of the color values, and generate the color values based on at least a result of the selected dot product module.

2. A circuit as recited in claim 1, wherein the interpolator module is further configured to generate one of the color values based on a center register value that is stored in a center register of the register array.

3. A circuit as recited in claim 1, wherein the interpolator module receives one or more sensor size signals that identify one or more attributes of a sensor that is used to form the digital image, and wherein the interpolator module selects one of the dot product modules for use in generating one of the color values based on a current relationship of information that is stored in the register array to the attributes.

4. A circuit as recited in claim 1, wherein the interpolator module receives a height signal and a width signal that respectively identify dimensions of a sensor that is used to form the digital image, and wherein the interpolator module selects one of the dot product modules for use in generating one of the color values based on a current relationship of information that is stored in the register array to the dimensions.

5. A circuit as recited in claim 1, wherein the register array comprises forty-nine (49) registers organized in seven (7) lines of seven (7) registers each.

6. A circuit as recited in claim 5, wherein the dot product modules comprise four (4) dot product modules, in which each of the dot product modules generates an interpolated color value of a first pre-determined color based on a center value of the register array that represents a second color.

7. A circuit as recited in claim 1, wherein the dot product modules comprise four (4) dot product modules, in which each of the dot product modules generates an interpolated color value of a first pre-determined color based on a center value of the register array that represents a second color.

8. A circuit as recited in claim 1, in which each of the dot product modules generates an interpolated color value of a first predetermined color based on a center value of the register array that represents a second color, and wherein the dot product modules comprise:

a first dot product module that generates a Green color value when the center value represents a Blue value or a Red value;

a second dot product module that generates a Red color value when the center value represents a Blue value and generates a Blue value when the center value represents a Red value;

a third dot product module that generates a Red color value when the center value represents a Green value among a plurality of alternating Green, Blue values and generates a Blue value when the center value represents a Green value among a plurality of alternating Blue, Green values; and a fourth dot product module that generates a Red color value when the center value represents a Green value among a plurality of alternating Green, Blue values and generates a Blue value when the center value represents a Green value among a plurality of alternating Blue, Green values.

9. A circuit as recited in claim 8, wherein the first dot product module is configured to generate an output color value M1 based on input pixel values at positions P12, P14, P16, P21, P23, P25, P27, P32, P34, P36, P41, P43, P45, P47, P52, P54, P56, P61, P63, P65, P67, P72, P74, P76 of the register array, according to the logic:

$$M1=((P23+P25+P32+P36+P52+P56+P63+P65)<<4+(P34+P43+P45+P54)<<6$$

$$-(P12+P16+P21+P27+P61+P67+P72+P76)<<2-(P12+P16+P21+P27+P61+P67+P72+P76)<<1$$

$$-(P14+P41+P47+P74)<<4-(P14+P41+P47+P74)<<2)>>8.$$

10. A circuit as recited in claim 8, wherein the second dot product module is configured to generate an output color value M2 based on input pixel values at positions P11, P13, P15, P17, P31, P33, P35, P37, P51, P53, P55, P57, P71, P73, P75, and P77, of the register array, according to the logic:

$$M2=((P11+P17+P71+P77)<<4+(P33+P35+P53+P55)<<7$$

$$+(P33+P35+P53+P55)<<4-(P13+P15+P31+P37+P51+P57+P73+P75)<<5-(P13+P15+P31+P37+P51+P57+P73+P75)<<4)>>8.$$

11. A circuit as recited in claim 8, wherein the third dot product module is configured to generate an output color value M3 based on input pixel values at positions values P12, P14, P16, P32, P34, P36, P52, P54, P56, P72, P74, and P76 of the register array, according to the logic:

$$M3=((P32+P36+P52+P56)<<5+(P34+P54)<<7$$

$$-(P12+P16+P72+P76)<<3-(P12+P16+P72+P76)<<1-(P12+P16+P72+P76)-$$

$$(P14+P74)<<5-(P14+P74)<<3-(P14+P74)<<1)>>8.$$

12. A circuit as recited in claim 8, wherein the fourth dot product module is configured to generate an output color value M4 based on input pixel values at positions P21, P23, P25, P27, P41, P43, P45, P47, P61, P63, P65, P67 of the register array, according to the logic:

$$M4=((P23+P25+P63+P65)<<5+(P43+P45)<<7-(P21+P27+P61+P67)<<3$$

$$-(P21+P27+P61+P67)<<1-(P21+P27+P61+P67)-(P41+P47)<<5$$

$$-(P41+P47)<<3-(P41+P47)<<1)>>8.$$

13. A method of interpolating a first color value associated with a first color and a second color value associated with a second color for use in generating a current pixel of interest that represents a portion of a digital image, wherein the method is carried out using an image processing circuit comprises a register array organized in a plurality of lines of registers; a plurality of shift registers, in which each of the shift registers is coupled to receive an input from one of the lines of registers and to shift said input to another one of the lines of registers; a plurality of dot product modules, each coupled to the register array, each of which generates an interpolated color value based on the register array; and an interpolator module configured to receive image data values stored in the register array into the dot product modules, select at least one of the dot product modules for use in generating one of the color values, and generate the color values based on at least a result of the selected dot product module, the method comprising the steps of:

creating and storing, in one of the dot product modules, first coefficient values that are associated with the first color and are associated with other values of the first color for pixels that surround the current pixel of interest;

bitwise shifting each of the first coefficient values by a predetermined power of 2;

creating and storing the first color value by applying the first coefficient values to the other values of the first color for the pixels that surround the current pixel of interest, using a bitwise shift operation;

bitwise shifting the first color value by a complement of the pre-determined power of 2; and displaying the digital image using at least the pixel comprising the first color value.

14. A method of claim 13, further including the steps of:

creating and storing, in one of the dot product modules, second coefficient values that are associated with the second color value and are associated with other values of the second color for other pixels that surround the current pixel of interest; and bitwise shifting each of the first coefficient values and the second coefficient values by a pre-determined power of 2.

15. A method of claim 14, further including the step of selecting the pre-determined power of 2 from among the values (64, 128, 256, 512).

16. A method of claim 14, wherein the steps of creating and storing a first matrix of first coefficient values and bitwise shifting each of the first coefficient values by a pre-determined power of 2 comprise the steps of:

creating and storing a first matrix of first coefficient values that are associated with the first color value and in which each of the first coefficient values is a multiple of a power of 2.

17. A method of claim 14, wherein the steps of creating and storing a first matrix of first coefficient values that are associated with the first color value and bitwise shifting each of the first coefficient values by a pre-determined power of 2 comprise the steps of:

creating and storing a first matrix of first coefficient values that are associated with the first color value and in which each of the first coefficient values is a multiple of a power of 2 selected from among the range (2, 4, 16, 64, 128, 256, 512).

18. A method as recited in claim 13, wherein the steps of creating and storing the first color value comprise the steps of:

adding all non-zero positive first coefficient values that are associated with the first color to create and store a positive sum value;

adding all non-zero negative first coefficient values that are associated with the first color to create and store a negative sum value;

subtracting the negative sum value from the positive sum value to create and store a net value; and bitwise shifting the first color value by a number of bits equal to $\log_2$ of the net value and storing a result as the first color value.

19. An image processing circuit that generates a plurality of color values each representing color components of a pixel of a digital image, the circuit comprising:

a digital storage array organized in a plurality of lines, each of the lines comprising a plurality of digital storage elements, each of which may receive a pixel value;

a plurality of shift registers, in which each of the shift registers is coupled to receive an input from one of the lines of the digital storage array and to shift said input to a first digital storage element of another one of the lines;

a plurality of computing modules, each coupled to the digital storage array, each of which generates an interpolated color value based on values stored in the digital storage array; and an interpolator module configured to receive image data values stored in the digital storage array into the computing modules, select at least one of the computing modules for use in generating one of the color values, and generate the color values based on at least a result of the selected computing modules.

20. A digital image processing system capable of interpolating a first color value associated with a first color and a second color value associated with a second color for use in generating a current pixel of interest that represents a portion of a digital image, the system comprising:

an image processing circuit comprising:

a register array organized in a plurality of lines of registers;

a plurality of shift registers, in which each of the shift registers is coupled to receive an input from one of the lines of registers and to shift said input to another one of the lines of registers;

a plurality of dot product modules, each coupled to the register array, each of which generates an interpolated color value based on the register array; and an interpolator module configured to receive image data values stored in the register array into the dot product modules, select at least one of the dot product modules for use in generating one of the color values, and generate the color values based on at least a result of the selected dot product module; and a computer-readable medium coupled to the interpolator module and comprising one or more instructions which may cause the interpolator module to carry out the steps of:

creating and storing, in one of the dot product modules, first coefficient values that are associated with the first color and are associated with other values of the first color for pixels that surround the current pixel of interest;

bitwise shifting each of the first coefficient values by a pre-determined power of 2;

creating and storing the first color value by applying the first coefficient values to the other values of the first color for the pixels that surround the current pixel of interest, using a bitwise shift operation;

bitwise shifting the first color value by a complement of the pre-determined power of 2; and displaying the digital image using at least the pixel comprising the first color value.

21. A system as recited in claim 20, wherein the instructions may cause the interpolator module to further carry out the steps of:

creating and storing, in one of the dot product modules, second coefficient values that are associated with the second color value and are associated with other values of the second color for other pixels that surround the current pixel of interest; and bitwise shifting each of the first coefficient values and the second coefficient values by a pre-determined power of 2.

22. A system as recited in claim 21, wherein the instructions may cause the interpolator module to further carry out the steps of selecting the pre-determined power of 2 from among the values (64, 128, 256, 512).

23. A system as recited in claim 21, wherein the steps of creating and storing a first matrix of first coefficient values and bitwise shifting each of the first coefficient values by a predetermined power of 2 comprise the steps of:

creating and storing a first matrix of first coefficient values that are associated with the first color value and in which each of the first coefficient values is a multiple of a power of 2.

24. A system as recited in claim 21, wherein the steps of creating and storing a first matrix of first coefficient values that are associated with the first color value and bitwise shifting each of the first coefficient values by a predetermined power of 2 comprise the steps of:

creating and storing a first matrix of first coefficient values that are associated with the first color value and in which each of the first coefficient values is a multiple of a power of 2 selected from among the range (2, 4, 16, 64, 128, 256, 512).

25. A system as recited in claim 20, wherein the steps of creating and storing the first color value comprise the steps of:

adding all non-zero positive first coefficient values that are associated with the first color to create and store a positive sum value;

adding all non-zero negative first coefficient values that are associated with the first color to create and store a negative sum value;

subtracting the negative sum value from the positive sum value to create and store a net value; and bitwise shifting the first color value by a number of bits equal to $\log_2$ of the net value and storing a result as the first color value.

* * * * *